United States Patent [19]

George

[11] 4,316,685
[45] Feb. 23, 1982

[54] PLUNGE TYPE ROUTER

[75] Inventor: William A. George, Cockeysville, Md.

[73] Assignee: Black & Decker Inc., Newark, Del.

[21] Appl. No.: 125,958

[22] Filed: Feb. 29, 1980

[51] Int. Cl.³ .......................... B23B 45/02; B23C 1/20
[52] U.S. Cl. ............................... 409/182; 144/134 D; 144/136 C; 408/112
[58] Field of Search .............................. 409/182, 184; 144/134 D, 136 C; 408/14, 112

[56] References Cited

U.S. PATENT DOCUMENTS

| | | | |
|---|---|---|---|
| 3,791,260 | 2/1974 | Ambler et al. | 409/182 |
| 4,041,997 | 8/1977 | Selfe | 144/136 C |
| 4,102,370 | 7/1978 | Vess | 144/134 D |

Primary Examiner—Z. R. Bilinsky
Attorney, Agent, or Firm—Harold Weinstein; Walter Ottesen; Edward D. Murphy

[57] ABSTRACT

A plunge type router is disclosed which includes a base housing having a work engaging surface and an upper portion within which a driving motor is supportingly mounted for reciprocable movement with respect thereto. A pair of extension coil springs are provided extending between a first pair of projections provided on the upper portion of the base housing and a second pair of projections secured to the motor housing which operate to continuously bias the driving motor into a retracted position. The extension springs are arranged in the form of loops positioned on opposite sides of the router and are concealed and protected by a pair of handles secured to the motor housing which handles are movable therewith.

12 Claims, 2 Drawing Figures

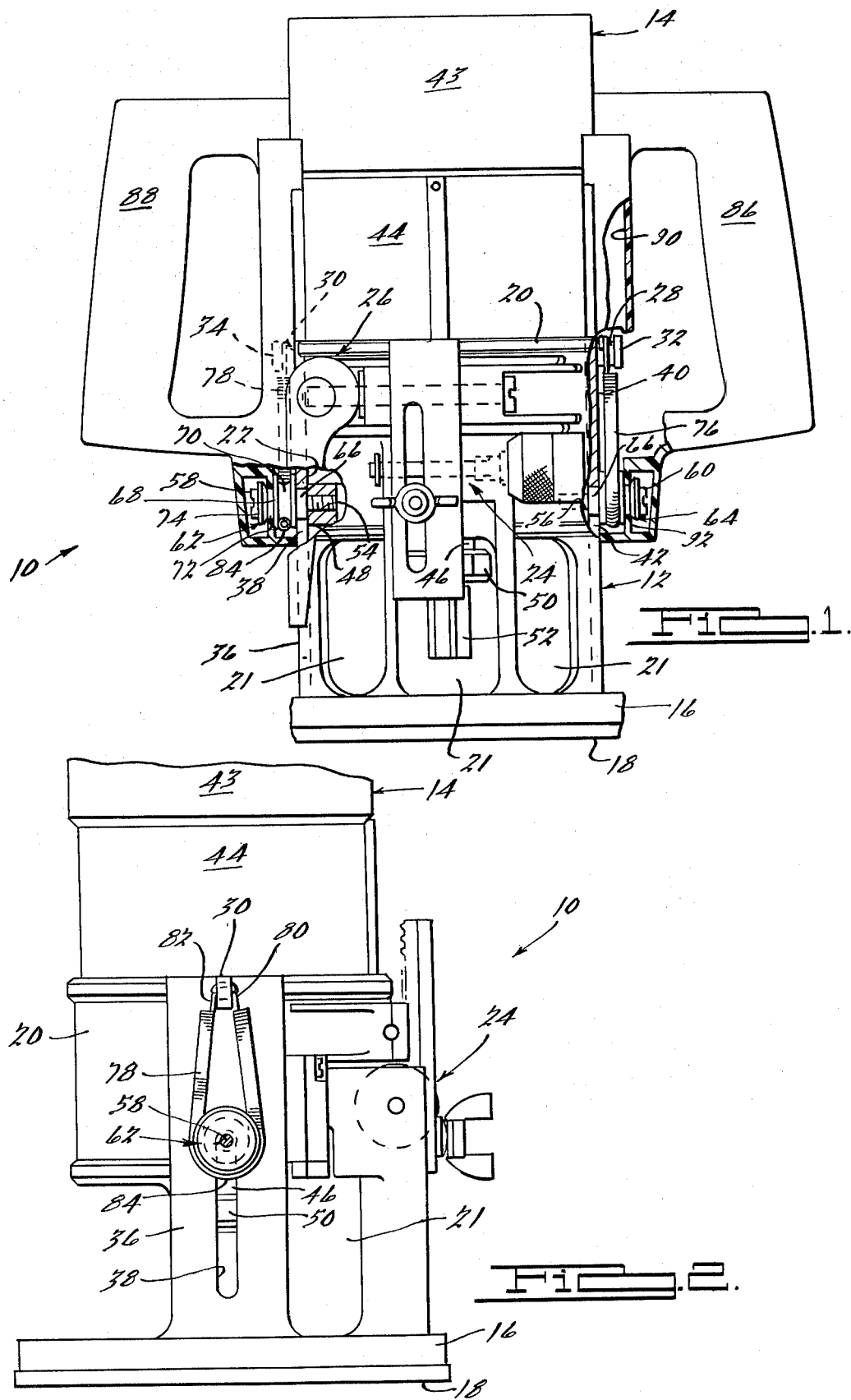

PLUNGE TYPE ROUTER

BACKGROUND AND SUMMARY OF THE INVENTION

The present invention relates generally to hand operated routers and more particulary to routers of the plunge type in which the driving motor and associated cutting bit are reciprocably movable with respect to the workpiece engaging base housing.

Plunge type routers are similar to conventional routers in that they include a driving motor having a bit holding chuck secured to one end of the motor drive shaft which motor is axially movably supported within a base housing. However, while in conventional non-plunge type routers, the motor is locked in position relative to the base housing such that the cutting tool or bit projects axially outwardly from the workpiece engaging surface of the base housing to the desired depth of cut at all times, the plunge type routers provide biasing means which operate to retract the cutting tool or bit into the base housing during periods of non-use.

Typically, such plunge type routers have required completely differently designed motor and base housings from those used in conjunction with non-plunge type routers in order to accommodate return biasing and guide means. In one form, the drivimg motor is movably supported on a base member by a pair of generally cylindrical support posts extending upwardly from the base member and telescopically received within a portion of the motor housing. Typically, the support posts are of a hollow construction and suitable compression springs are mounted therein which operate to bias the motor and associated cutting bit into a retracted position. While this biasing and support arrangment may initially offer satisfactory performance, it is relatively expensive to manufacture due to the need to adhere to relatively close tolerances between the telescoping support posts so as to provide a smooth movement thereof while the biasing spring is being compressed. Further, because such constructions have the biasing springs compressibly positioned within normally two relatively small diameter support posts having limited engaging surface area, both the support posts and biasing springs are subject to wear resulting from the continuous reciprocating compression and relaxation movement of the biasing spring during operation of the router. This resulting wear may result in premature breakage or weakening of the biasing springs or may allow excessive lateral movement of the motor relative to the base resulting in cocking or other objectionable movement of the cutting tool during a plunge operation or may cause the motor to "hang up", any one of which may result in erroneous cuts in the workpiece.

The present invention, however, overcomes these disadvantages by employing a pair of extension springs extending between projections formed on a base housing of a design similar to that of non-plunge type routers which base housing also includes an upstanding generally cylindrically shaped portion having a bore extending therethrough within which the motor assembly is movably supported and guided. A pair of projections are also secured to the lower end of the motor housing and a pair of springs are connected between the motor assembly projections and the base housing projections which operate to bias the motor assembly into a retracted position. Suitable handles are also provided which are secured to the motor housing so as to overlie and protect the extension springs.

Thus, the present invention provides an economical plunge type router construction which not only substantially reduces the cost of manufacturing by eliminating the need for closely machined telescopic support posts but also provides improved reliability of operation by significantly reducing wear because the biasing springs are located remotely from the movement guiding means. Reliability of the router is also enhanced because the wear resulting from reciprocable movement of the motor assembly is spread around the entire circumference of the motor housing.

Further, the construction of the present invention allows a standard motor housing to be used in construction of both plunge and non-plunge type routers thereby offering additional manufacturing cost savings. It should also be noted that because the biasing springs are readily accessible by merely removing the handles, replacement thereof may be very easily and quickly accomplished thus reducing the time during which the tool is out of service.

Additional advantages and features of the present invention will become apparent from the subsequent description and the appended claims taken in conjunction with the accompanying drawings.

BRIEF DESCRIPTION OF THE DRAWINGS

FIG. 1 is an elevational view of a router in accordance with the present invention with portions thereof broken away; and FIG. 2 is an elevational view of the router of FIG. 1 shown rotated approximately 90° and with one of the handles removed therefrom.

DESCRIPTION OF THE PREFERRED EMBODIMENT

Referring now to the drawings, there is shown a plunge type router in accordance with the present invention indicated generally at 10 and which includes a base housing 12 and a driving motor assembly 14 movably disposed therein.

Base housing 12 includes a generally circularly shaped lower flange portion 16 having a lower work engaging surface 18 and a generally cylindrically shaped upper portion 20 which includes a relatively large diameter bore 22 extending axially therethrough within which motor assembly 14 is movably disposed. A plurality of cutout portions 21 are provided in upper portion 20 immediately adjacent the lower end thereof which afford a view of the interior of base housing 12. Upper portion 20 of base housing 12 has a depth adjustment assembly 24 provided thereon operative to enable the depth of cut to be preselected and a clamp assembly 26 which is operative to enable the motor housing to be clamped in position relative to housing 12. Depth of cut assembly 24 and clamp assembly 26 as shown are both described more fully and form a part of the subject matter disclosed in a copending application entitled "Plunge Type Router", Ser. No. 125,957, filed Feb. 29, 1980, and assigned to the same assignee as the present invention, the disclosure of which is hereby incorporated by reference. It should be noted, however, that any other suitable depth of cut adjustment assembly and/or clamp assembly may be utilized in conjuction with the return biasing construction of the present invention if desired.

Base housing 12 also has a pair of generally radially outwardly extending projections or ears 28 and 30 provided thereon which are positioned in a substantially diametrically opposite relationship. While, as shown, projection 28 and 30 are integrally formed with upper portion 20 of base housing 12, they may alternatively be separately attached thereto. Each of projections 28 and 30 includes an enlarged retaining flange portion 32 and 34 respectively provided on the outer edge thereof.

As best seen with reference to FIG. 2, upper portion 20 of base housing 12 has a vertically extending portion 36 having a generally planar outer surface and defined in part by cutout portions 21 in which an elongated slot 38 is provided having a longitudinal axis extending generally parallel to the direction of movement of motor housing 14 with respect to base housing 12 and substantially vertically aligned with projection 30. A second generally vertically extending portion 40 is also provided on upper portion 20 of base housing 12 diametrically opposite portion 36 and also includes an elongated slot 42 having a longitudinal axis extending in substantially parallel relationship to the direction of movement of motor housing 14 and substantially vertically aligned with projection 28.

Motor assembly 14 includes a housing 43 having a generally cylindrically shaped lower portion 44 which is movably received within bore 22 provided in base housing 12. A driving motor is disposed within housing 43 and has a rotatably driven shaft 46 projecting outwardly from the lower end 48 of housing 43. A conventional chuck 50 is secured to shaft 46 and is adapted to receive a suitable cutting tool or bit 52 which is rotatably driven thereby. A pair of threaded openings 54 and 56 are also provided in motor housing 43 adjacent the lower end 48 thereof which are positioned substantially diametrically opposite each other and open generally radially outwardly.

A pair of threaded fasteners such as bolts 58 and 60 are provided which extend through slots 38 and 42 and into threaded engagement with respective openings 54 and 56. Bolts 58 and 60 are each operative to secure a relatively short irregularly shaped spring retaining bushing member 62 and 64 respectively to motor housing 43. As best seen in FIG. 1, each of the spring retaining bushing members are substantially identical and includes a generally cylindrically shaped portion 66 of a diameter substantially equal to or slightly less than the width of slots 38 and 42 and is received therein being operative to assist in guiding movement of housing 43 with respect to base housing 12. Portion 66 also cooperates with the upper and lower ends of slots 38 and 42 to limit movement of motor housing 14 with respect to base housing 12 between retracted and extended positons. An enlarged diameter generally cylinrically shaped portion 68 is formed adjacent the outer end of portion 66 and has an annular groove 70 provided therein. A reduced diameter portion 72 is also provided positioned immediately outwardly from portion 66 and a second enlarged diameter portion 74 is provided on the outer end of retaining bushing member 62.

A pair of relatively long helical extension springs 76 and 78 are also provided each having opposite end portions 80, 82 fastened to respective projections 28 and 30 so as to form a loop with the center portion 84 of each of the loops being received within grooves 70 provided on respective retaining bushings 62 and 64.

Springs 76 and 78 will preferably be of relatively small diameter and of a length selected so as to insure a sufficient biasing action to maintain motor housing 43 in a fully retracted position as shown in FIG. 1.

In order to conceal and protect springs 76 and 78, a pair of handles 86 and 88 are provided which are adapted to be secured to motor housing 43 on opposite sides thereof and are movable therewith. As shown, each of handles 86 and 88 includes a cavity 90 formed therein which is adapted to accommodate both springs 76 and 78 and respective projections 28 and 30 thereby allowing movement of handles 86 and 88 along with the motor assembly 14 relative to base housing 12. Also, each of handles 86 and 88 are provided with integrally formed internal flange portions 92 adapted to engage reduced diameter portion 72 of each of the spring retaining bushings which thereby assist in retaining handles 86 and 88 secured thereto.

In operation, a user of the present invention will grasp handles 88 and 86 of router 10 and position surface 18 of flange portion 16 on the workpiece with the center opening provided therein (not shown) appropriately located relative to the area to be machined. Once positioned, a downwardly directed pressure is applied to handles 86 and 88 thereby causing motor assembly 14 to move downwardly with respect to base housing 12 thereby moving the cutting tool 52 from the retracted position as shown in FIG. 1 outwardly relative to base housing 12. This downward movement will also operate to stretch or extend springs 76 and 78 due to the downward movement of spring retainers 62 and 64. Bore 22 will cooperate with portion 44 of motor housing 14 to guide this downward movement although portions 66 of spring retainers 62 and 64 may also cooperate with respective slots 38 and 42 to assist in guiding this movement. It should be noted that in order to assure free movement of motor housing 14 with respect to base housing 12, portions 66 will preferably have an axial length at least equal to and preferably slightly greater than the distance between the sidewall of motor housing 14 and the outer surface of vertical extending portions 36 of base housing 12.

Upon completion of the cutting operation, the user need merely remove downwardly directed pressure on the handles whereupon the biasing action of springs 76 and 78 will operate to return motor housing 14 and associated cutting tool 52 to a retracted position.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

I claim:

1. In a plunge type router including a base housing having an upper portion, a bore extending through said upper portion, a lower flange portion including a work engaging lower surface, a driving motor assembly including a motor housing extending into said bore, said driving motor assembly including a driving shaft extending outwardly from the lower end of said motor housing, chuck means secured to said shaft for attaching a cutting tool to said shaft, said motor housing being reciprocably movable with respect to said base housing between a retracted position in which said cutting tool is positioned above said work engaging surface and an extended position in which said cutting tool projects downwardly below said work engaging surface, improved means for biasing said motor housing into a retracted position comprising first attaching means provided on said base housing; said base housing including an elongated slot having a longitudinal axis extending generally parallel to the direction of movement of said motor housing; second attaching means provided on said motor housing; said second attaching means including stop means engageable with a portion of said base housing for limiting movement of said motor assembly with respect thereto; said stop means comprising a bushing member received within said slot and engageable with opposite longitudinal ends thereof; and biasing means extending between said first and second attaching means and operative to bias said motor housing into said retracted position.

2. A plunge type router as set forth in claim 1 wherein said biasing means are moved from a relaxed condition to a stressed condition in response to movement of said motor housing from said retracted position to said extended position.

3. A plunge type router as set forth in claim 1 wherein said router further includes handle means, said handle means being secured to said motor housing in overlying relationship to biasing means.

4. A plunge type router as set forth in claim 1 wherein said first and second attaching means are positioned along a line extending substantially parallel to the axis of rotation of said driving shaft.

5. A plunge type router as set forth in claim 1 wherein said biasing means comprises an elongated extension spring.

6. A plunge type router as set forth in claim 5 wherein said extension spring has a pair of opposite ends both connected to one of said first and second attaching means and a central portion connected to the other of said first and second attaching means.

7. A plunge type router as set forth in claim 6 wherein said ends of said spring are attached to said first attaching means and said second attaching means includes a grooved portion, said central portion being retained in said grooved portion.

8. In a plunge type router including a base housing having an upper portion, a bore extending through said upper portion, a lower flange portion having a work engaging lower surface, a driving motor assembly including a motor housing extending into said bore, said driving motor assembly including a driving shaft extending outwardly from the lower end of said motor housing, chuck means secured to said shaft for attaching a cutting tool to said shaft, said motor housing being reciprocably movable with respect to said base housing between a retracted position in which said cutting tool is positioned above said work engaging surface and an extended position in which said cutting tool projects downwardly below said work engaging surface, improved means for biasing said motor housing into a retracted position comprising:

a first pair of projections positioned in substantially diametrically opposed relationship and extending generally radially outwardly from said base housing;

a second pair of projections secured in substantially diametrically opposed relationship to said motor housing and projecting generally radially outwardly therefrom, said second pair of projections projecting outwardly through openings provided in said base housing and being positioned below said first pair of projections;

a pair of extension springs each being connected between one of said first pair of projections and one of said second pair of projections, said extension spring being operative to bias said motor aasembly toward said retracted position; and a pair of handle means secured to said motor asembly, one of said handle means overlying and protecting each of said pair of extension springs.

9. A plunge type router as set forth in claim 8 wherein said second pair of projections include stop means for limiting movement of said motor assembly between said retracted and extended positions.

10. A plunge type router as set forth in claim 9 wherein said openings in said base housing comprise a pair of elongated slots having longitudinal axes extending generally parallel to the direction of movement of said motor housing and said stop means comprise a pair of bushing members received within each of said slots, said bushing members being engageable with longitudinally opposite ends of said slots so as to limit said movement.

11. A plunge type router as set forth in claim 10 wherein each of said second pair of projections further include grooved portions having a center portion of said springs fitted therein, each of said springs having opposite ends secured to respective of said first pair of projections.

12. A plunge type router as set forth in claim 11 wherein said second pair of projections are secured to a lower edge of said motor housings by threaded fasteners.

* * * * *